United States Patent

Fedorovich

[11] Patent Number: 5,967,524
[45] Date of Patent: Oct. 19, 1999

[54] HYBRID SEAL DEVICE

[75] Inventor: George Fedorovich, Nacogdoches, Tex.

[73] Assignee: JM Clipper Corporation, Nacogdoches, Tex.

[21] Appl. No.: 08/931,493

[22] Filed: Sep. 16, 1997

Related U.S. Application Data

[63] Continuation-in-part of application No. 08/725,958, Oct. 7, 1996, Pat. No. 5,735,530, which is a continuation of application No. 08/251,268, May 31, 1994, abandoned, which is a continuation-in-part of application No. 08/064,375, May 21, 1993, Pat. No. 5,316,317.

[51] Int. Cl.$^6$ ............................. F16J 15/32; F16J 15/447
[52] U.S. Cl. ............................................ 277/351; 277/419
[58] Field of Search ..................... 277/347, 350, 277/351, 412, 418, 419, 420, 421, 429

[56] References Cited

U.S. PATENT DOCUMENTS

| | | |
|---|---|---|
| 2,003,000 | 5/1935 | Kelpe . |
| 2,571,352 | 10/1951 | Fast . |
| 2,995,390 | 8/1961 | Gardner . |
| 3,015,504 | 1/1962 | Fulton et al. . |
| 3,128,104 | 4/1964 | Teske . |
| 3,277,797 | 10/1966 | Tyree, Jr. et al. . |
| 3,330,564 | 7/1967 | Sikora . |
| 3,459,431 | 8/1969 | Baker . |
| 3,973,779 | 8/1976 | Burgmann et al. . |
| 4,022,479 | 5/1977 | Orlowski . |
| 4,114,902 | 9/1978 | Orlowski . |
| 4,175,752 | 11/1979 | Orlowski . |
| 4,304,409 | 12/1981 | Orlowski . |
| 4,379,600 | 4/1983 | Muller ................................. 308/187.1 |
| 4,432,557 | 2/1984 | Drucktenhengst . |
| 4,448,426 | 5/1984 | Jackowski et al. . |
| 4,576,383 | 3/1986 | Ballard . |
| 4,596,394 | 6/1986 | Schmitt . |
| 4,667,967 | 5/1987 | Deuring . |
| 4,699,526 | 10/1987 | Sato . |
| 4,706,968 | 11/1987 | Orlowski . |
| 4,743,034 | 5/1988 | Kakabaker et al. . |
| 4,848,937 | 7/1989 | Hartman et al. ........................ 384/480 |
| 4,852,890 | 8/1989 | Borowski . |
| 4,890,941 | 1/1990 | Calafell, II et al. .................... 384/480 |
| 4,989,883 | 2/1991 | Orlowski . |
| 5,024,451 | 6/1991 | Borowski . |
| 5,025,917 | 6/1991 | Smith et al. . |
| 5,028,054 | 7/1991 | Peach . |
| 5,040,804 | 8/1991 | Back . |
| 5,069,461 | 12/1991 | Orlowski . |
| 5,158,304 | 10/1992 | Orlowski . |
| 5,174,583 | 12/1992 | Orlowski . |
| 5,207,291 | 5/1993 | Mezzedimi et al. ................... 184/6.16 |
| 5,211,406 | 5/1993 | Katzensteiner . |
| 5,221,095 | 6/1993 | Orlowski . |
| 5,228,700 | 7/1993 | Biesold et al. . |
| 5,238,166 | 8/1993 | Schwarstein et al. . |
| 5,259,628 | 11/1993 | Nisley . |
| 5,269,536 | 12/1993 | Matsushima et al. . |
| 5,290,047 | 3/1994 | Duffee et al. . |
| 5,299,349 | 4/1994 | Seibig ..................................... 29/447 |
| 5,305,509 | 4/1994 | Yuhara et al. .............................. 29/39 |
| 5,347,189 | 9/1994 | Chuta et al. . |
| 5,378,000 | 1/1995 | Orlowski . |
| 5,403,019 | 4/1995 | Marshall . |
| 5,456,476 | 10/1995 | Premiski et al. . |
| 5,478,090 | 12/1995 | Simmons et al. . |
| 5,498,006 | 3/1996 | Orlowski . |
| 5,522,601 | 6/1996 | Murphy . |
| 5,636,848 | 6/1997 | Hager et al. . |

Primary Examiner—Anthony Knight
Assistant Examiner—John L. Beres
Attorney, Agent, or Firm—Dickstein Shapiro Morin & Oshinsky LLP

[57] ABSTRACT

A system for providing a labyrinth seal and a contact seal between a housing and a shaft is formed of a stator and a rotor connected to each other. The stator includes a flange biased toward the rotating shaft to prevent fluid from exiting the housing. The rotor rotates frictionlessly relative to the stator, creating a two-piece non-contact labyrinth seal to prevent contaminants from entering the housing. The rotor and stator may be held together by an annular protrusion located within a recess.

9 Claims, 8 Drawing Sheets

HYBRID SEAL DEVICE

This is a continuation-in-part of U.S. patent application Ser. No. 08/725,958, Oct. 7, 1996, now U.S. Pat. No. 5,735,530, which is a continuation of Ser. No. 08/251,268, filed May 31, 1994, now abandoned, which is a continuation-in-part of Ser. No. 08/064,375, filed May 21, 1993, now U.S. Pat. No. 5,316,317.

BACKGROUND OF THE INVENTION

The present invention relates to a device for providing a seal between a shaft and a housing. In particular, the present invention relates to a static and dynamic seal device for preventing lubricant from leaking out of a housing and/or for preventing contaminants from traveling into the housing.

Prior art devices for sealing a rotating shaft are disclosed in U.S. Pat. No. 4,022,479 (Orlowski) and U.S. Pat. No. 5,024,451 (Borowski). Seal devices of this type may be used to prevent lubricant from escaping out of a bearing housing and/or to prevent contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing means, not shown in the prior art patent. The ring members themselves have no means for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

The ring members of the Borowski device are held together by a bead and a groove provided on the ring members themselves. The bead fits within the groove with an interference fit. This arrangement is an improvement over the Orlowski system in the sense that no separate securing means is needed. But the Borowski device is still unsatisfactory because the bead must be resiliently deformed to be positioned within the groove, and the groove must be correspondingly enlarged to receive the deformed bead. The deformation of the bead during assembly makes it difficult to achieve the desired close positioning between the two ring members, as explained in more detail below.

Furthermore, neither the Orlowski system nor the Borowski device provide satisfactory static sealing in flooded conditions as well as dynamic sealing during operation.

Prior art devices showing labyrinth and/or contact seals are disclosed in U.S. Pat. No. 5,259,628 (Nisley), U.S. Pat. No. 5,028,054 (Peach), and U.S. Pat. No. 4,379,600 (Muller). The device referred to in Muller is a dust seal between an inner race and an outer race. The dust seal is accomplished either through a labyrinth arrangement of L-shaped rings or through a contact seal. The device of Muller provides no mechanism for sealing, either dynamically or statically, fluid from exiting the device.

The device disclosed by Nisley is a seal assembly with a rotor, a housing, a V-ring and a metal ring. The housing and the rotor have alternating teeth and grooves which intermesh to form a labyrinth seal. The metal ring fits within an angular groove in the housing. The V-ring is positioned on the rotor and makes contact with the metal ring. The device as disclosed by Nisley is, thus, formed of four separate machined pieces, and is relatively expensive to manufacture. Such a seal device, since it has four separate parts which must be fit together, will have correspondingly greater leakage points than a seal device with fewer parts. Further, the V-ring is positioned to make contact with a metal ring, which may wear the V-ring, leading to an opening between the housing and the rotor through which contaminants and fluid may travel.

The device referred to in Peach has, like Nisley, numerous separately machined or formed parts, thus increasing the device's expense, complexity and possibility of leakage.

SUMMARY OF THE INVENTION

The disadvantages of the prior art are alleviated to a great extent by the present invention which provides a hybrid seal device including an interlocked two-piece non-contact labyrinth seal portion, with a rotor and stator, as well as a contact lip seal portion.

In one aspect of the invention, the lip seal extends into the fluid side of the housing and is biased toward and contacts a rotating shaft.

In another aspect of the invention, the rotor has a connecting portion located radially exterior to the stator connecting portion. In another aspect of the invention, the stator has a connecting portion located radially exterior to the rotor connecting portion.

An object of the invention is to provide an interconnected two piece seal having a labyrinth seal portion and a separate, contact lip seal portion for both static and dynamic sealing. Forming the seal of only two pieces is advantageous. A two piece seal may have fewer leakage paths than a three piece seal. Moreover, a two piece seal may be more economical to manufacture and more reliable.

Another object of the invention is to provide a lip seal which provides a static seal during flooded conditions.

Another object of the present invention is to provide a seal device that can be accurately assembled, with very little play.

Another object of the invention is to provide a high performance seal device that can be produced economically.

Other objects and advantages of the present invention will become apparent from the following description and drawings which illustrate preferred embodiments of the present invention.

DETAILED DESCRIPTION OF PREFERRED EMBODIMENTS

Figure 1:
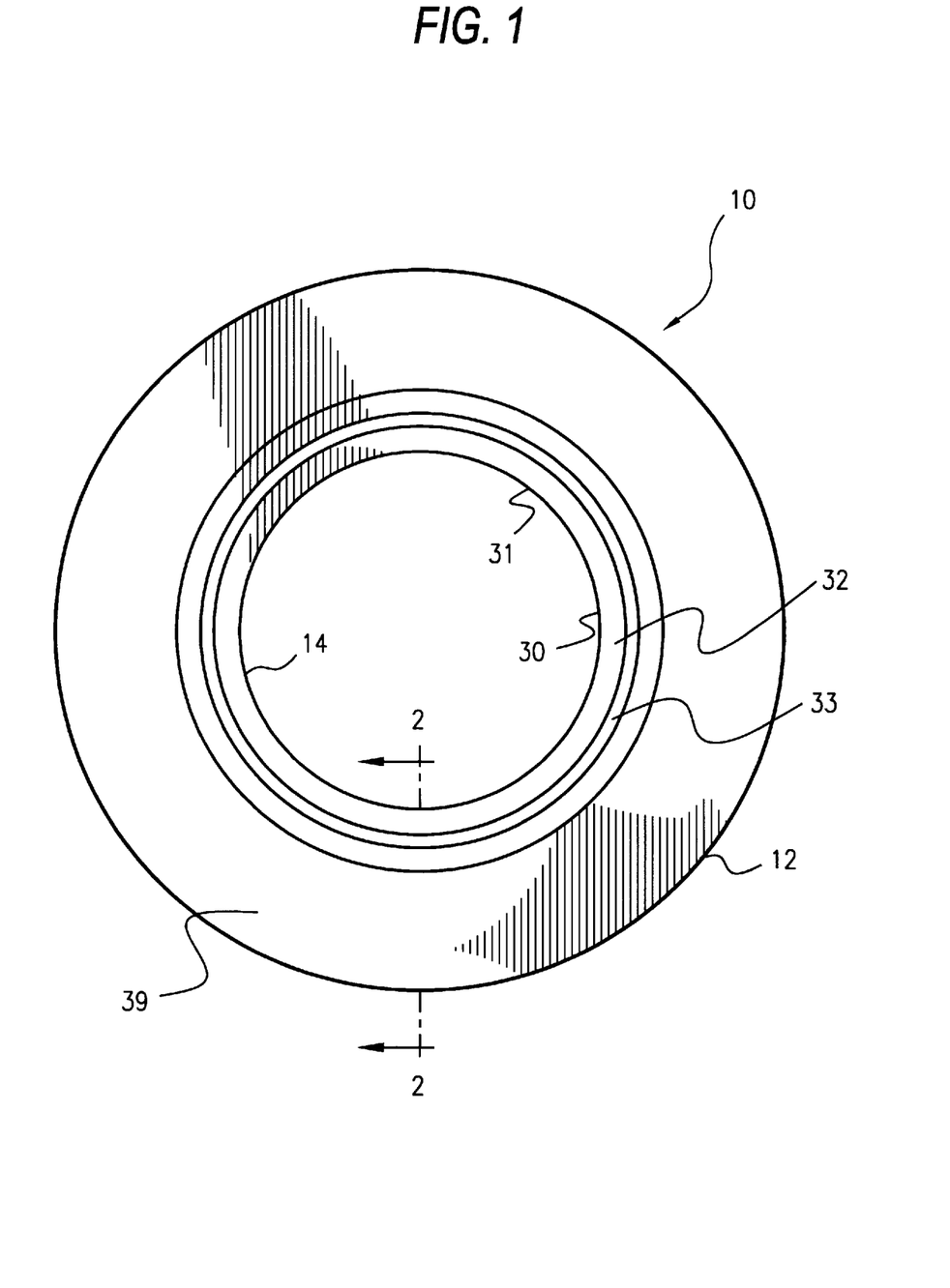
FIG. 1 is a front elevational view of a seal device constructed in accordance with a first embodiment of the present invention.
Figure 2:
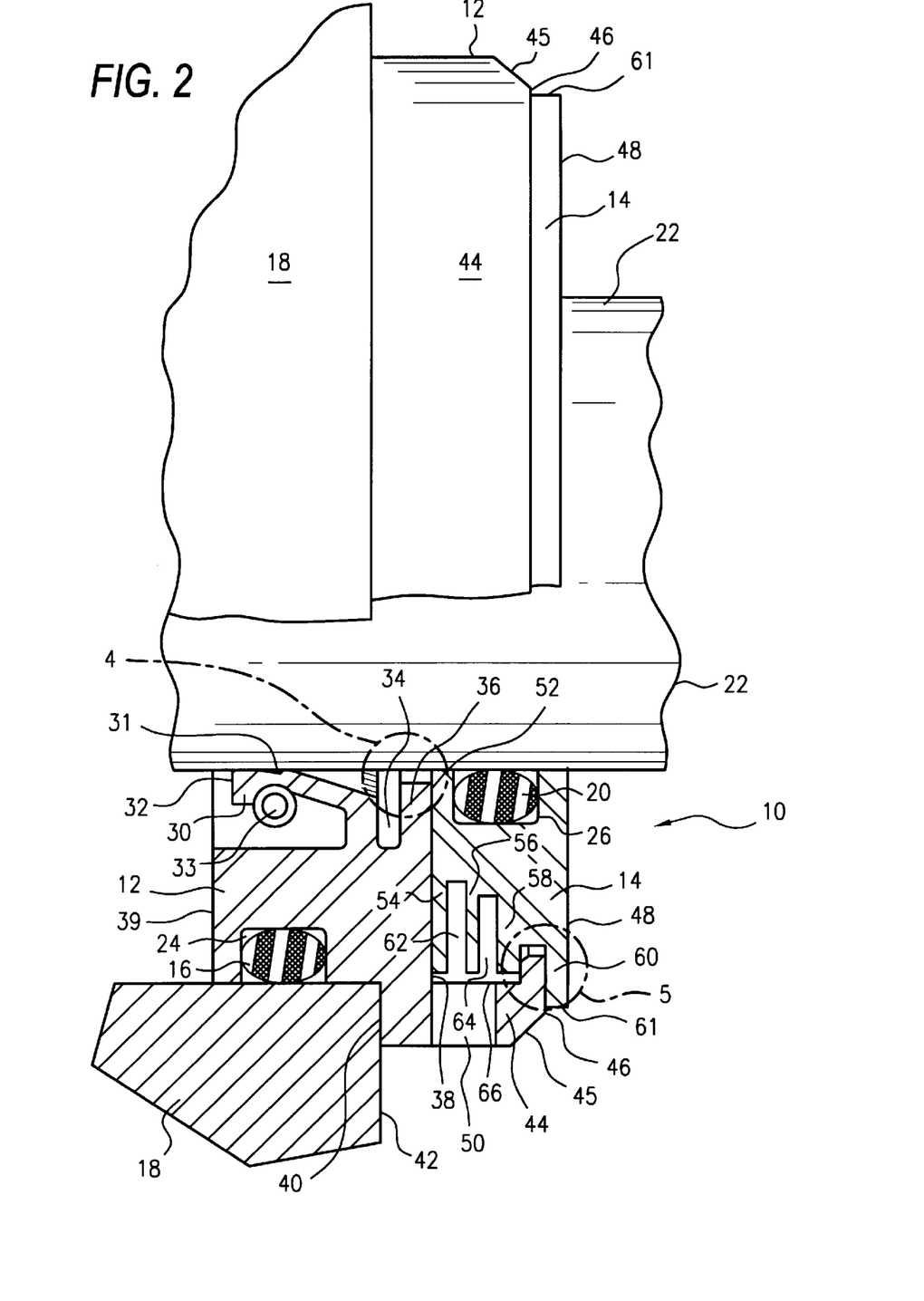
FIG. 2 is a partial cross sectional side view of the seal device of FIG. 1, taken along line 2—2 of FIG. 1, but showing the seal device employed within a sealed system.
Figure 3:
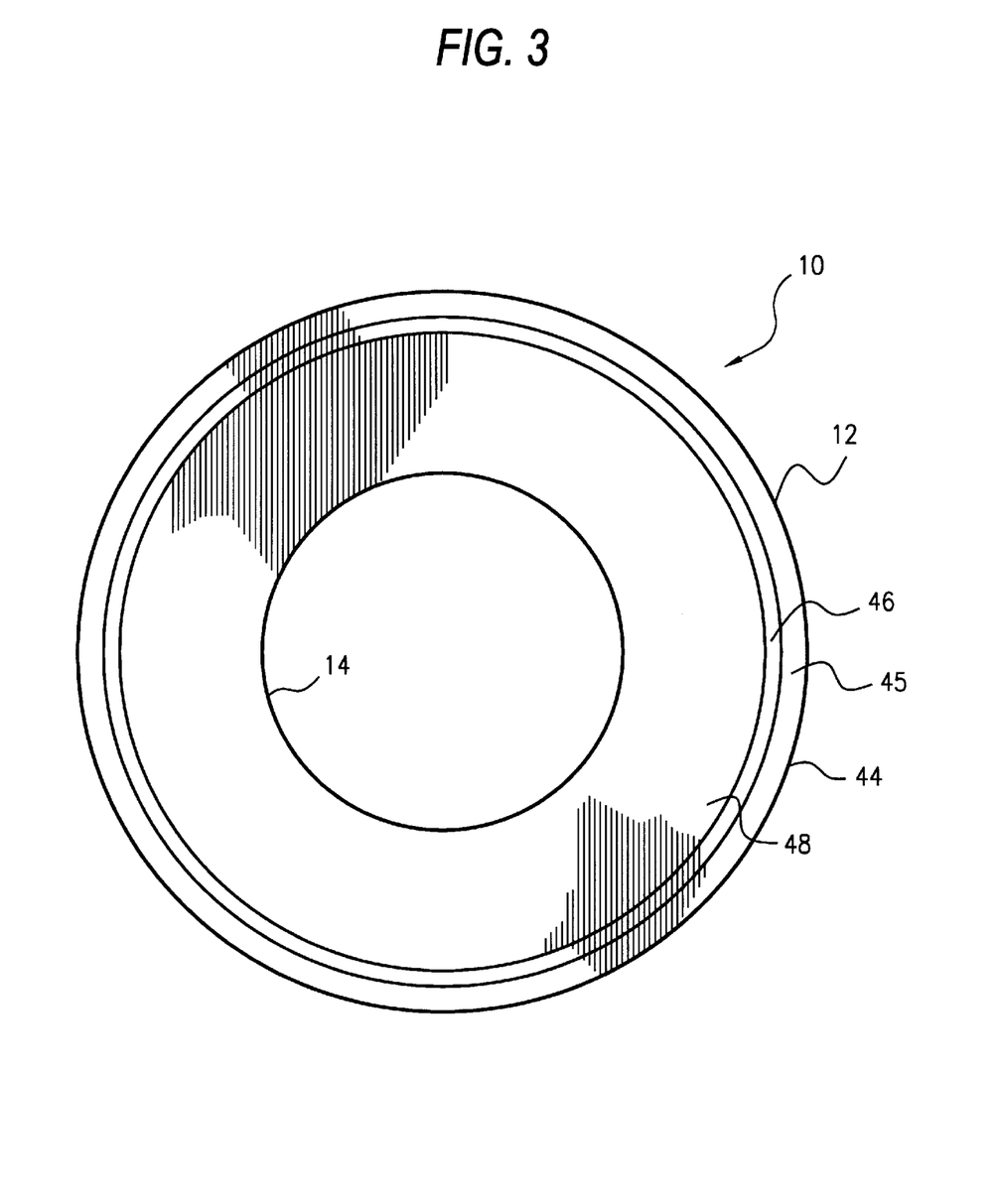
FIG. 3 is a rear elevational view of the stator for the seal device of FIG. 1.

Referring now to the drawings, wherein like reference numerals indicate like elements, there is shown in FIGS. 1–3 a ring-shaped seal device 10 constructed in accordance with a first embodiment of the present invention. The seal device 10 includes a stator 12 and a rotor 14 (FIG. 2). An O-ring 16 is provided between the stator 12 and a housing 18 (FIG. 3), and an O-ring 20 is provided between the rotor 14 and a shaft 22. In a preferred embodiment of the invention, the stator and rotor members 12, 14 may be made of polytetrafluoroethylene (PTFE) or PTFE alloy or other suitable materials. Alternatively, the ring-shaped rotor 14 may be made of a suitable metal. The O-rings 16, 20 may be made of a suitable elastomeric material.

The stator O-ring 16 provides a tight seal between the stator 12 and the housing 18. Moreover, the radial compression of the O-ring 16 between the stator 12 and the housing 18 is sufficient to prevent the stator 12 from rotating with respect to the housing 18. The rotor O-ring 20 provides a tight seal between the rotor 14 and the shaft 22, and the compression of the O-ring 20 between the rotor 14 and the shaft 22 is sufficient to make the rotor 14 rotate in unison with the shaft 22.

In operation, the stator O-ring 16 prevents oil from escaping out of the housing 18 around the outside of the stator 12, and the rotor O-ring 20 prevents contaminants from traveling into the housing 18 along the surface of the shaft 22. Oil and contaminants are dynamically prevented from reaching the interface between the two ring-shaped members 12, 14, as explained in more detail below.

Since the stator 12 does not rotate with respect to the housing 18, the stator O-ring 16 is not subjected to friction. Therefore, the stator O-ring 16 has a long useful life. Similarly, since the rotor 14 does not rotate with respect to the shaft 22, the rotor O-ring 20 is not subjected to friction and has a long useful life.

The stator O-ring 16 is located within an annular recess 24. As illustrated in FIG. 3, the recess 24 has a rectangular cross section. The rotor O-ring 20 is also located within a rectangular cross sectioned annular recess 26. The purpose of the recesses 24, 26 is to ensure that the O-rings 16, 20 are located in their proper positions when the seal device 10 is installed within the housing 18 to provide a seal around the shaft 22.

For clarity of illustration, the O-rings 16, 20 are not shown in FIGS. 1 and 3.

Referring to FIG. 2, the stator 12 has a flange 30, having an inner surface 31 and an end face 32. The flange 30 is biased toward and contacts the shaft 22. An optional tension spring or O-ring 33 may be positioned on the flange 30 to provide greater biasing force radially inward toward the shaft 22. The flange 30 prevents oil or other fluids from escaping from the housing 18. Further, the flange 30 acts as a static seal for the seal device 10 during flooded conditions. Such an arrangement provides better dynamic and static sealing during flooded conditions than seal devices which incorporate a plurality of alternating annular ridges and grooves in connection with an axial groove leading back into the housing.

Figure 4:
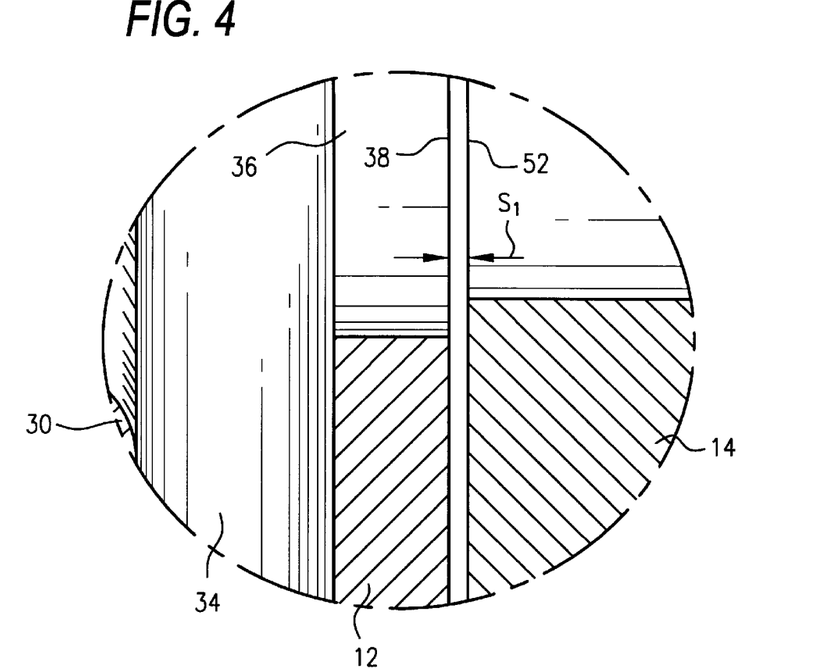
FIG. 4 is an enlarged view of the interface shown in circle 4 of FIG. 2 but without the shaft.

The stator 12 further includes an annular groove 34 and an annular ridge 36. The annular ridge 36 includes an outwardly directed end face 38 and a radially inwardly facing surface 37 (FIG. 4). The inner surface 31 is radially interior to the surface 37. The stator 12 has an inwardly directed end face 39. The groove 34 provides stress relief for the stator 12 and prevents a gap from opening up in the interface between the rotor 14 and the stator 12.

In operation, lubricating oil traveling outwardly along the surface of the shaft 22 is blocked from traveling beyond the flange 30 due to the contact of the flange surface 31 with the shaft 22. Even when the shaft 22 is not rotating, the flange 30 provides a static seal, through contact of the flange surface 31 with the shaft 22, and prevents fluids from escaping from or entering the housing 18 during flooded conditions.

The stator 12 has an inwardly directed shoulder face 40 for contacting an outer wall 42 of the housing 18 (FIG. 2). The shoulder face 40 is used during assembly to properly locate the stator 12 with respect to the housing 18. That is, the stator 12 may be simply pushed into the housing 18 until the shoulder face 40 abuts against the housing wall 42. The shoulder face 40 prevents the stator 12 from moving too far into the housing 18. The shoulder face 40 may be omitted in an alternative embodiment of the invention. Space limitations may prevent the use of the shoulder face 40.

The stator 12 also has a ring-shaped cover 44. The cover 44 extends axially outwardly from the shoulder face 40. The cover 44 includes an inclined surface 45 and an outwardly directed end face 46. The cover 44 has a radial slot-shaped opening 50. The opening 50 is located at the bottom of the seal device 10. The cover opening 50 is used to direct contaminants out of the seal device 10, as described in more detail below.

Referring to FIG. 4, the rotor 14 has an inwardly directed face 52 adjacent the outwardly directed face 38 of the stator 12. The two faces 52, 38 are spaced apart from each other such that there is essentially no friction between the two faces 52, 54. But the axial distance $S_1$ between the two faces 52, 38 is very small. The distance $S_1$ should be very small to prevent particles from traveling in a radially inward direction (i.e., toward the shaft 22) between the two faces 52, 38. If the stator and rotor members 12, 14 are made of PTFE alloy, or another suitable material, then the faces 52, 38 may lightly touch each other.

As illustrated in FIG. 2, alternating annular ridges 54, 56, 58, 60 and recesses 62, 64 are located between the opposite end faces 52, 48 of the rotor 14. In the illustrated embodiment of the invention, the inner recess 62 is deeper than the outer recess 64. In an alternative embodiment of the invention, the recess 64 may be deeper than the inner recess 62. The purpose of the alternating ridges 54, 56, 58, 60 and recesses 62, 64 is to prevent contaminants from traveling toward the interior of the housing 18 and reaching the inwardly directed end face 52 of the rotor 14, as described in more detail below.

In operation, contaminants that find their way into the space between the end face 46 and the rotor 14 come into contact with the surfaces of the rotor recesses 62, 64. The rotation of the rotor 14 causes the contaminants to be thrown by centrifugal force onto an inner wall 66 of the cover 44. The contaminants then move by gravity though the slot-shaped opening 50.

The stator 12 and the rotor 14 are connected together by connecting portions shown in circle 5 of FIG. 2. As illustrated in detail in FIG. 5, the rotor 14 has an outward annular recess 68 and the cover 44 has a radially inwardly extending annular protrusion 70. The recess 68 is positioned between ridges 58 and 60 and located close to the outwardly directed end face 46 of the cover 44. The recess 68 has a rectangular cross section with an outwardly directed side face 72, an inwardly directed side face 74, and a cylindrical outer surface 76. The protrusion 70 may have a slanted surface 78 for guiding the cover 44 into the rotor 14. The ridge 58 has a radially outwardly facing surface 57 which, as illustrated, may include an inclined surface 59 to assist in facilitating the cover 44 into the rotor 14.

Figure 5:
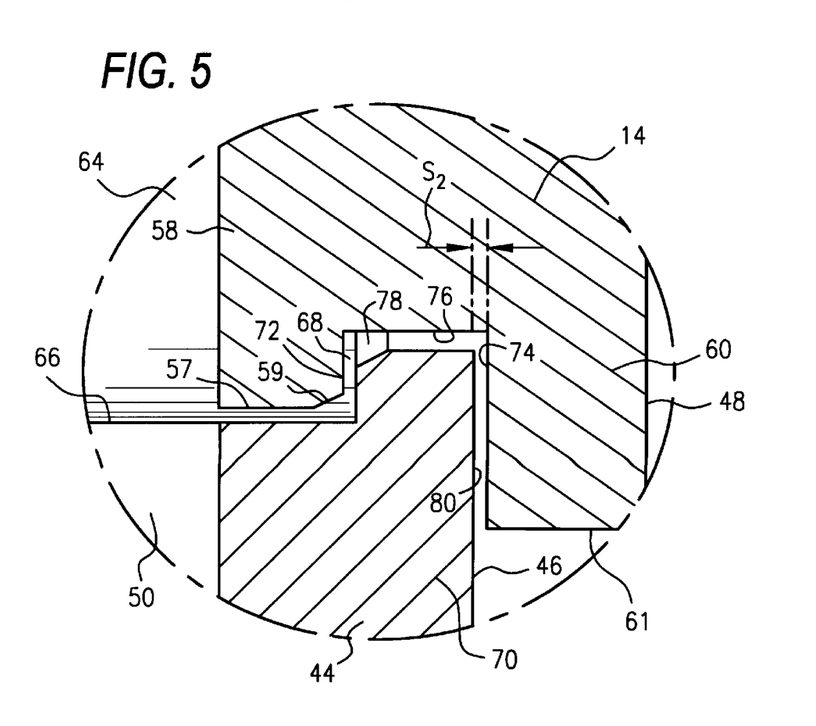
FIG. 5 is an enlarged view of the connecting portions shown in circle 5 of FIG. 2.

The protrusion 70 also has an outwardly directed side face 80 designed to be in close proximity to the inwardly directed side face 74 of the stator 12. The axial distance between the side face 80 of the protrusion 70 and the inwardly directed side face 74 of the recess 68 is designated by reference character It is advantageous to minimize the sum of the axial distances $S_1$ and $S_2$ (FIGS. 4 and 5). This sum will be referred to herein as the total axial play $S_t$ of the seal device 10 ($S_t=S_1+S_2$) In particular, the total axial play $S_t$ should be as small as possible without being equal to zero. When the axial play $S_t$ is very small, there is very little room for contaminants to move in a radial direction through the interface between the rotor 14 and the stator 12 (i.e., between the end faces 52, 38). The rotor 14 should fit within the stator 12 with just enough play $S_t$ to ensure that there is substantially no friction between the relatively rotating members 12, 14.

Figure 6:
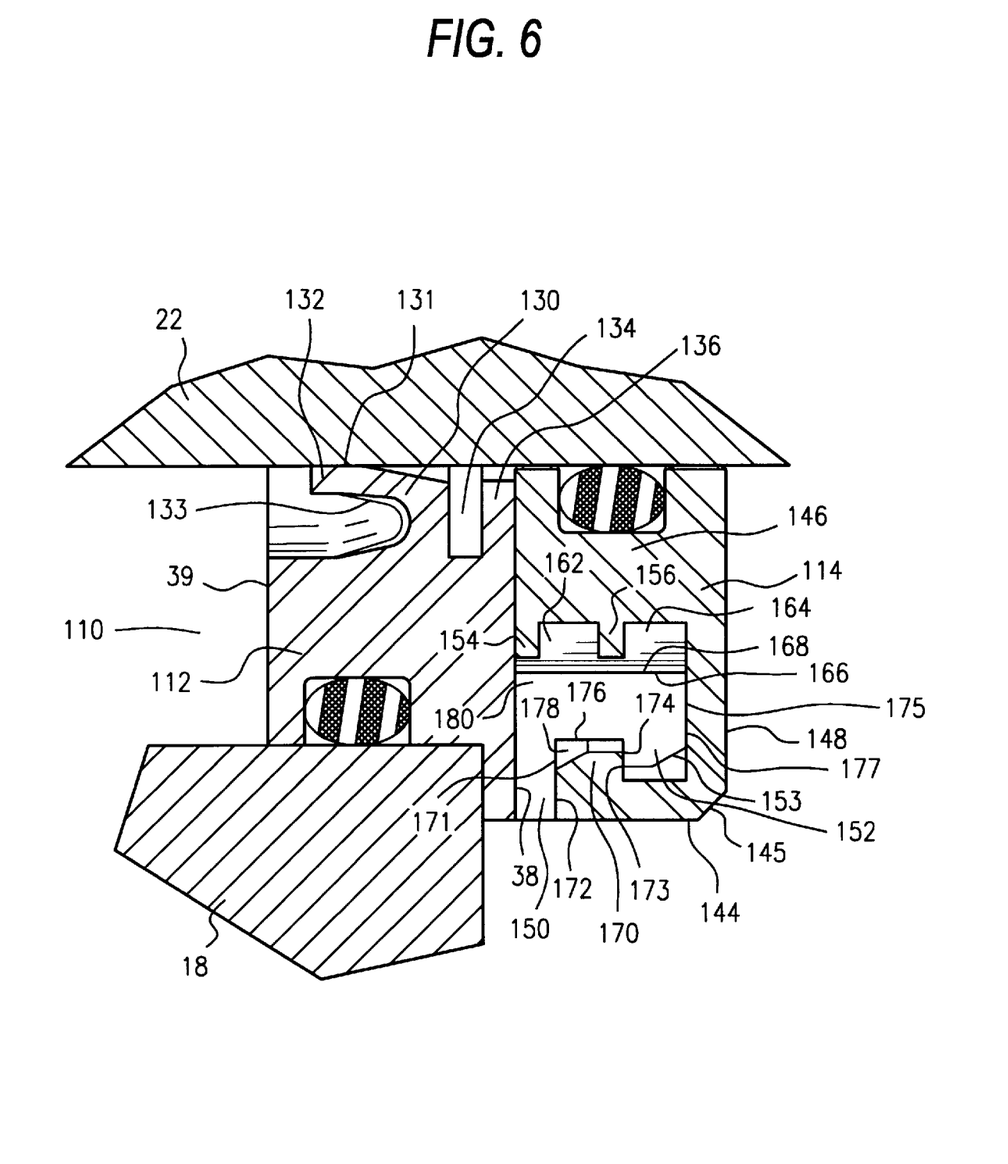
FIG. 6 is a partial cross sectional side view of a seal device constructed in accordance with another embodiment of the present invention, with the seal device positioned between a shaft and a housing.

Another seal device 110 constructed in accordance with the present invention is illustrated in FIG. 6. The seal device 110 is ring-shaped and has a stator 112 and a rotor 114 having a flange 144 and a base portion 146. The ring-shaped members 112, 114 may be constructed of any suitable material, such as metal or PTFE alloy.

As illustrated in FIG. 6, the stator 112 has a flange 130 with an end face 132 and a surface 131 in contact with the shaft 22. The flange 130 functions essentially the same as the flange 30. Further, a biasing spring 133 may be positioned so as to place a greater biasing force on the flange 130 toward the shaft 22. Spring 133 differs from spring 33 (FIG. 2) in that spring 133 lacks the helical design of spring 33, and thus provides less material to become fouled by the fluids within the housing 18.

The rotor 114 has an end face 148 which extends from the base portion 146 up to an inclined surface 145, which abuts the end face 148. The flange 144 has an inward protrusion 170. The protrusion 170 has an inwardly facing surface 172 and an outwardly facing surface 173. The base portion 146 of the rotor 114 includes alternating ridges 154, 156 and annular recesses 162, 164. The recesses 162, 164 are shown to be of equal depth, although in alternative embodiments either recess could be deeper than the other. Positioned between the base portion 146 and the flange 144 is a recess 168. An inwardly facing surface 175 of the rotor 114 faces the recess 168.

The stator 112 includes a cover 180 having an outwardly facing surface 171, a radially outwardly facing surface 176, a radially inwardly facing surface 166 and a protrusion 152. The outwardly facing surface 171 is close to the inwardly facing surface 172 of the protrusion 170. The protrusion 152 has an inwardly facing surface 174 which is close to the outwardly facing surface 173 of the protrusion 170 and an outwardly facing surface 177 which is close to the inwardly facing surface 175 of the rotor 114. The cover 180 is positioned within the recess 168 such that the protrusion 152 interlocks with the protrusion 170. The protrusions 152 and 170 may, as illustrated, have inclined portions 153 and 178, respectively, to facilitate interlocking of the protrusions 152, 170.

In operation, any contaminants traveling between surfaces 171 and 172, surfaces 173 and 174, and surfaces 175 and 177 may eventually reach recesses 162 and 164. The rotation of the rotor 114 will cause the contaminants to be thrown by centrifugal force onto the inner wall 166 of the cover 180. The contaminants will then drain by gravity through opening 150 and will not enter the housing 18.

Figure 7:
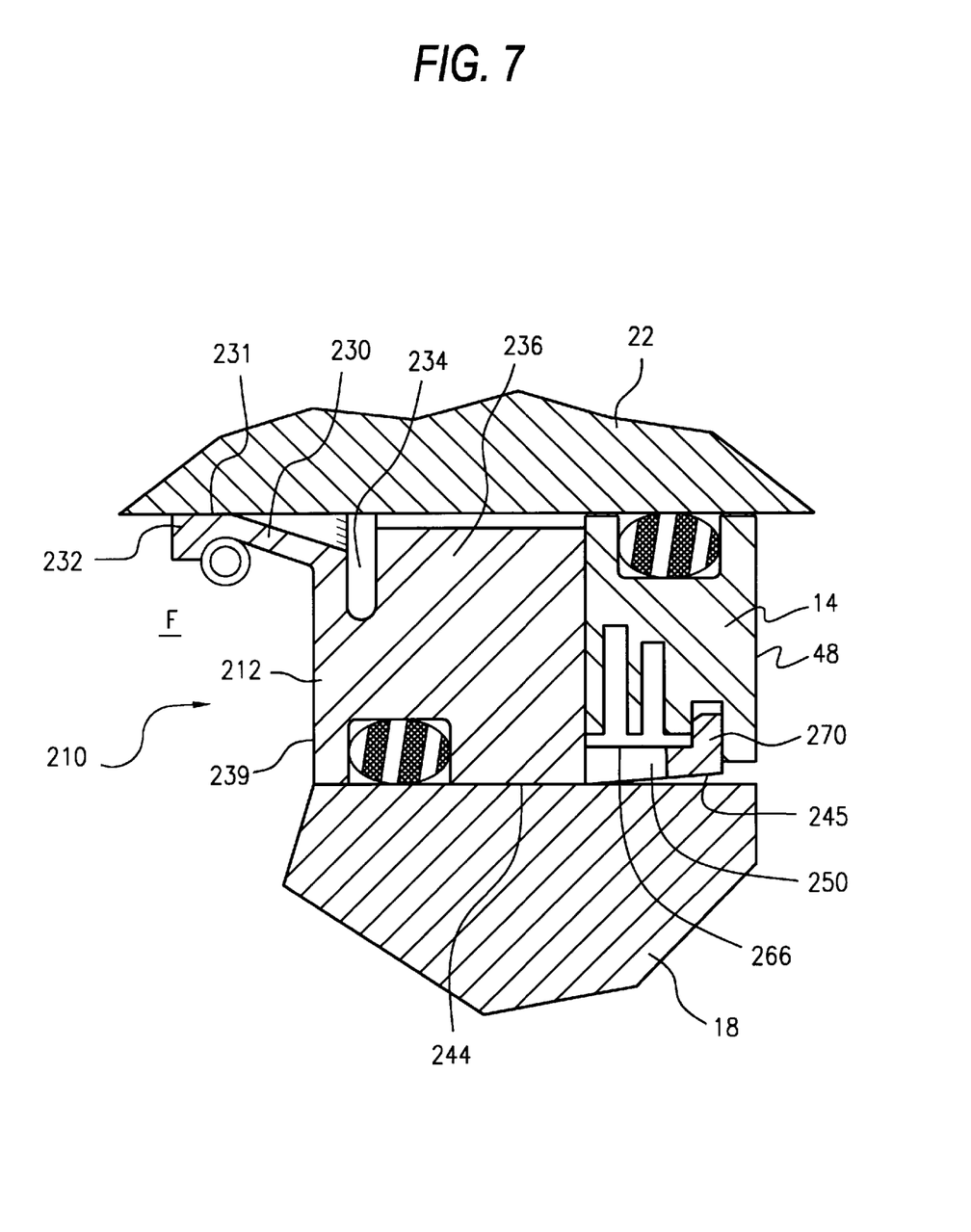
FIG. 7 is a partial cross sectional side view of a seal device constructed in accordance with another embodiment of the present invention, with the seal device positioned between a shaft and a housing.

Another seal device 210 constructed in accordance with the present invention is illustrated in FIG. 7. The seal device 210 is ring-shaped and has a stator 212 and a rotor 14. As in the above-described embodiments, an O-ring 16 is provided between the stator 212 and the housing 18, and an O-ring 20 is provided between the rotor 14 and a shaft 22. The ring-shaped stator 212 may be made of the same materials as the ring members 12, 14, 112, 114 of the embodiments illustrated in FIGS. 1–3 and 6.

The stator 212 has an inwardly directed end face 239. The inward side is the fluid side F of the housing 18. The stator 212 has a flange 230, with an end face 232 and a contacting surface 231. The flange 230 functions essentially the same as the flanges 30, 130 in previous embodiments. One major difference between previous embodiments is that the flange 230 extends into and operates on the fluid side F of the housing 18, due to the positioning of the seal device 210 (described in greater detail below). This embodiment of the invention, which is positioned deeper within the housing, is appropriate for arrangements where there is sufficient room within the housing 18 for the seal device 210 but limited room outside the housing 18.

The stator 212 includes an annular ridge 234 which acts as a stress relief for the stator 212 to prevent a gap from being formed in the interface between the stator 212 and the rotor 14. Further, the stator 212 includes an annular ridge 236, which is thicker than the annular ridges 36, 136 of the embodiments of FIGS. 1–3 and 6.

The seal device 210 is adapted to function further within the housing 18 than the previously discussed embodiments. Unlike the embodiments illustrated in FIGS. 1–3 and 6, the stator 212 lacks an inwardly directed shoulder face 40 for contacting an outer wall 42 of the housing 18. The FIG. 7 embodiment may be used where space limitations prevent the use of the shoulder face 40. As shown in FIG. 7, the seal device 210 is placed such that both the stator 212 and the rotor 14 are within the housing 18, whereas in previously discussed embodiments a portion of the stator 12, 112 and all of the rotor 14, 114 were outside of the housing 18.

The stator 212 further includes a cover 244, which includes an inclined portion 245 having an inwardly extending annular protrusion 270. The protrusion 270 functions essentially the same as protrusion 70 of the embodiment illustrated in FIGS. 1–3 and 9. The inclined portion 245 is inclined inwardly toward the shaft 22 and away from the housing 18 and is necessitated because the seal device 210 is positioned so deeply within the housing 18.

The operation of the embodiment illustrated in FIG. 7 is similar to the operation of the embodiment illustrated in FIGS. 1–3. The stator o-ring 16 prevents oil from escaping out of the housing 18 around the outside of the stator 212, and the rotor O-ring 20 prevents contaminants from traveling into the housing 18 along the surface of the shaft 22. Oil and contaminants are dynamically prevented from traveling in a radial direction through the interface between the two ring-shaped members 212, 14.

Any contaminants traveling into the seal device 210 through the interface between the protrusion 270 of the stator 212 and the annular ridge 60 of the rotor 14 come into contact with the surfaces of the rotor recesses 62, 64. The rotation of the rotor 14 causes the contaminants to be thrown by centrifugal force onto the inner wall 266 of the cover 244. The contaminants then move by gravity though the slot-shaped opening 250 and may move out of the housing 18 due to the space provided by the inclined portion 245.

Figure 8:
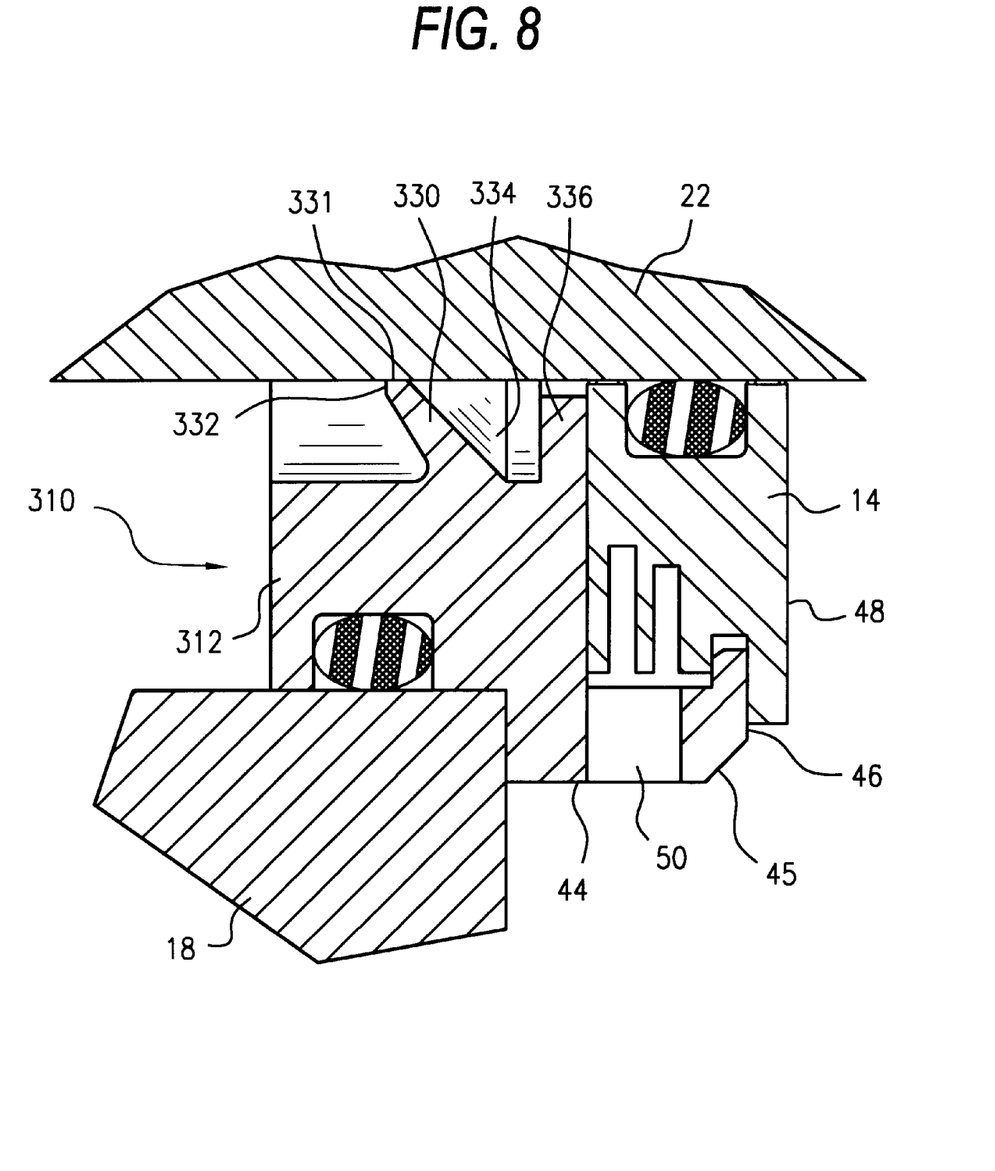
FIG. 8 is a partial cross sectional side view of a seal device constructed in accordance with another embodiment of the present invention, with the seal device positioned between a shaft and a housing.
Figure 9:
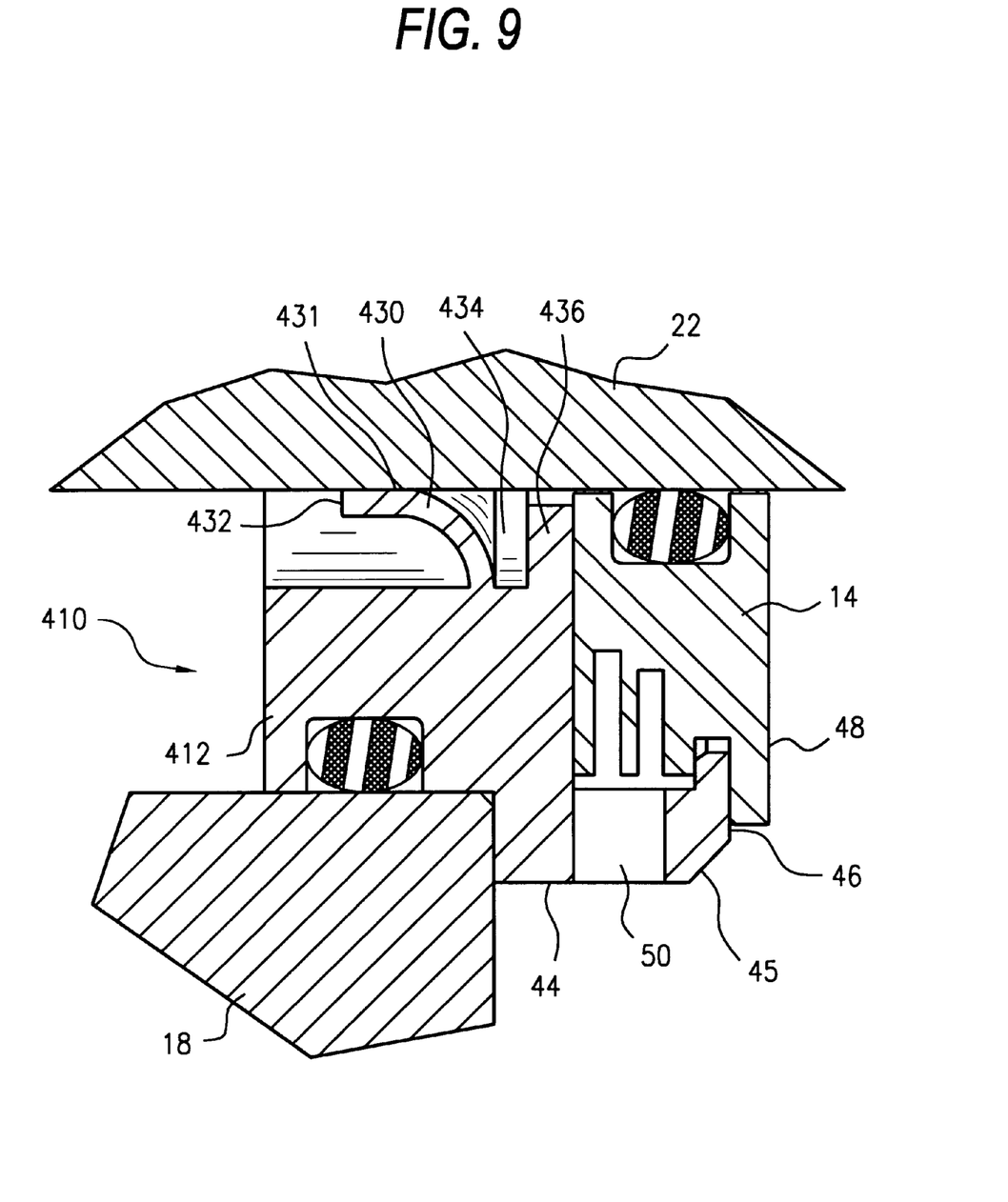
FIG. 9 is a partial cross sectional side view of a seal device constructed in accordance with another embodiment of the present invention, with the seal device positioned between a shaft and a housing.

Two other seal devices 310 and 410 constructed in accordance with the present invention are illustrated, respectively, in FIGS. 8 and 9. The seal devices 310 and 410 are similar in structure and function to the seal device 10 illustrated in FIGS. 1–3. A major difference between the seal devices 310 and 410 and seal device 10 is the shaping of the contact flange 330, 430 of the stator 312, 412. In the seal device 310, the flange 330 is inclined toward the shaft 22 and includes a relatively short contact surface 331. The flange 330 is easier to machine and/or form than the other flanges 30, 130 and 230. In the seal device 410, the flange 430 is resiliently rounded toward the shaft 22 and has a contact surface 431 which is of greater width than the contact surface 331 (measured in the direction of the shaft 22). The flange 430 provides a greater contact surface than the other flanges 30, 130, 230 and 330.

The contact flanges 30, 130, 230, 330 and 430 may be formed by a variety of different methods, such as by machining to shape or by forming after machining.

The above description is intended to be illustrative of preferred embodiments which can achieve the objects, features and advantages of the present invention. For example, while a two-piece hybrid seal has been described for use with a rotating shaft, the present invention also encompasses such a hybrid seal for use with a rotating bore. It is not intended that the present invention be limited thereto. Any modifications coming within the spirit and scope of the following claims are to be considered part of the present invention.

What is claimed as new and desired to be protected by Letters Patent of the United States is:

1. A two-piece interconnected hybrid seal device for use in a system having a housing with an opening therein and a shaft extending through said opening, for providing a seal between the housing and the shaft, the shaft and housing rotating relative to one another, comprising:
   a stator attached to said housing and including:
      an inner circumference;
      an opening;
      a cover having an inwardly facing surface;
      a connecting portion, said stator connecting portion including an annular protrusion on said cover, said annular protrusion having a slanted surface for guiding said stator into said rotor; and
      a flange with an inner surface radially interior to said inner circumference;
   a rotor attached to said shaft and adapted to rotate relative to said stator said rotor having a plurality of alternating annular recesses and annular ridges and a connecting portion which rotates frictionlessly relative to said stator connecting portion, said rotor connecting portion including an annular recess, said annular protrusion being located within said recess; and
   a biasing spring which biases said flange toward the shaft;
   wherein said rotor and said stator form a non-contact labyrinth seal for preventing contaminants from entering the housing, and wherein said alternating annular recesses and annular ridges, said inwardly facing surface, and said opening are adapted to function together to guide contaminants out of the housing, and wherein said flange provides a contact seal between said stator and said shaft to prevent fluid from exiting the housing.

2. The device of claim 1, wherein said stator includes an inwardly projecting annular recess, said recess adapted to provide stress relief to said stator.

3. The device of claim 1, wherein said stator and said rotor are adapted to be located completely within said housing.

4. The device of claim 1, wherein said biasing spring is helical.

5. The device of claim 1, wherein said stator includes an inwardly directed end face, said flange extending inward of said end face.

6. The device of claim 1, wherein said flange is rounded.

7. A sealed system, comprising:
   a rotating shaft;
   a housing; and
   a two-piece interconnected hybrid seal device including:
      a stator attached to said housing and having a flange biased toward and in contact with said shaft, said stator including an opening, a connecting portion and a cover having an inwardly facing surface, said stator connecting portion being included on said cover;
      a rotor attached to said shaft to rotate with said shaft relative to said stator and said housing, said rotor including a plurality of alternating annular recesses and annular ridges and a connecting portion, said rotor connecting portion rotating frictionlessly relative to said stator connecting portion; and
      a biasing spring which biases said flange toward the shaft;
      wherein said rotor and said stator form a non-contact labyrinth seal for preventing contaminants from entering said housing, said alternating annular recesses and annular ridges, said inwardly facing surface, and said opening function together to guide contaminants out of the housing, and said flange provides a contact seal to prevent fluid from exiting said housing.

8. The system of claim 7, wherein said stator includes an inwardly projecting annular recess.

9. The system of claim 7, wherein said stator and said rotor are both located completely within said housing.

* * * * *